United States Patent
Matsuzaki et al.

(10) Patent No.: US 10,109,123 B2
(45) Date of Patent: Oct. 23, 2018

(54) WORK VEHICLE AND ABNORMALITY NOTIFICATION METHOD FOR WORK VEHICLE

(71) Applicant: Kubota Corporation, Osaka-shi (JP)

(72) Inventors: Yushi Matsuzaki, Sakai (JP); Atsushi SHinkai, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/385,765

(22) Filed: Dec. 20, 2016

(65) Prior Publication Data

US 2018/0025560 A1    Jan. 25, 2018

(30) Foreign Application Priority Data

Jul. 22, 2016  (JP) .................................. 2016-144563

(51) Int. Cl.
  *G07C 5/08*  (2006.01)
  *A01B 76/00*  (2006.01)
  *G05D 1/02*  (2006.01)
  (Continued)

(52) U.S. Cl.
  CPC .............. *G07C 5/0841* (2013.01); *A01B 1/00* (2013.01); *A01B 76/00* (2013.01); *A01D 41/127* (2013.01);
  (Continued)

(58) Field of Classification Search
  CPC .. G07C 5/0841; G07C 5/0808; G07C 5/0816; G05D 1/0276; G05D 1/0278;
  (Continued)

(56) References Cited

U.S. PATENT DOCUMENTS 9,500,114 B2 * 11/2016 Shimazu ................ B60K 35/00
9,721,399 B2 *  8/2017 Ishikawa .............. G07C 5/0808
(Continued)

FOREIGN PATENT DOCUMENTS

JP         10-155327       6/1998
JP         2000-201104     7/2000
(Continued)

OTHER PUBLICATIONS

Ikeda et al., Abnormal incident detection system employing image processing technology, 1999, IEEE, p. 748-752.*
(Continued)

*Primary Examiner* — McDieunel Marc
(74) *Attorney, Agent, or Firm* — Mori & Ward, LLP

(57) ABSTRACT

A work vehicle includes travelling work state detection sensors to detect a travelling work state of the work vehicle to output detected signals indicating the traveling work state. Circuitry is configured to determine that an early abnormality occurs when the detected signals satisfy a first condition, the work vehicle being in an early stage of trouble in travelling due to the early abnormality. The circuitry is configured to determine that an actual abnormality occurs when the detected signals satisfy a second condition which has a second threshold severer than a first threshold of the first condition, the work vehicle being in trouble in travelling due to the actual abnormality. The circuitry is configured to provides notifications of the early abnormality and the actual abnormality toward an outside of the work vehicle when it is determined that the early abnormality and the actual abnormality occurs, respectively.

9 Claims, 5 Drawing Sheets

(51) Int. Cl.
    *A01B 1/00*     (2006.01)
    *A01D 41/127*   (2006.01)
    *E02F 9/26*     (2006.01)

(52) U.S. Cl.
    CPC ........... *E02F 9/267* (2013.01); *G05D 1/0276* (2013.01); *G07C 5/0808* (2013.01); *G07C 5/0816* (2013.01)

(58) Field of Classification Search
    CPC ........ A01B 76/00; A01B 69/00; G08C 17/02; G05B 9/02; B60K 35/00; B60C 23/0479
    USPC .......................................................... 701/23
    See application file for complete search history.

(56) References Cited

U.S. PATENT DOCUMENTS

| | | | |
|---|---|---|---|
| 9,841,768 B2* | 12/2017 | Hiramatsu | G05D 1/0278 |
| 2015/0246613 A1* | 9/2015 | Shimazu | B60K 35/00 701/102 |
| 2016/0031448 A1* | 2/2016 | Sakai | G05B 9/02 701/23 |
| 2016/0033968 A1* | 2/2016 | Sakai | G08C 17/02 701/23 |
| 2016/0229234 A1* | 8/2016 | Sudou | B60C 23/0479 |
| 2017/0079195 A1* | 3/2017 | Yokoyama | A01B 69/00 |

FOREIGN PATENT DOCUMENTS

| | | |
|---|---|---|
| JP | 2005-215742 | 8/2005 |
| JP | 2011-220104 | 11/2011 |

OTHER PUBLICATIONS

Mad et al., Abnormal driving detection using real time Global Positioning System data, 2011, IEEE, p. 1-6.*

* cited by examiner

WORK VEHICLE AND ABNORMALITY NOTIFICATION METHOD FOR WORK VEHICLE

CROSS-REFERENCE TO RELATED APPLICATIONS

The present application claims priority under 35 U.S.C. § 119 to Japanese Patent Application No. 2016-144563, filed Jul. 22, 2016. The contents of this application are incorporated herein by reference in their entirety.

BACKGROUND OF THE INVENTION

Field of the Invention

The present invention relates to a work vehicle and an abnormality notification method for a work vehicle.

Discussion of the Background

Japanese Patent Application Laid-open No. H10-155327 discloses a combine. The combine computes, when an engine is started, a drive load, i.e., an idling load on the engine during no-load operation, based on results of detection by a rack position sensor and an engine speed sensor. If the idling load is outside a set range, the combine provides notification of an abnormality of the engine by blinking an engine lamp and sounding a buzzer simultaneously. In the combine, a grain threshing unit is driven by operating a grain threshing clutch lever to engage a grain threshing clutch. If a grain threshing load during no-load operation is computed based on results of detection by the rack position sensor and the engine speed sensor and is outside a set range, the combine provides notification of an abnormality of the grain threshing unit by blinking a grain threshing lamp and sounding a buzzer simultaneously.

Japanese Patent Application Laid-open No. 2000-201104 discloses a vehicle equipped with an information transmitter for recording maintenance information for the vehicle, and transmitting the maintenance information with a mobile phone, and also discloses a maintenance station for servicing this vehicle. When detecting an abnormality on a vehicle state, the vehicle transmits information regarding this abnormality to the maintenance station. When receiving the information, the maintenance station recognizes that the vehicle owned by a customer is required to be serviced, and notifies the customer through the vehicle for a corresponding action, such as the vehicle should be brought into the maintenance station, or the customer himself/herself is urged to service the vehicle.

A riding control machine according to Japanese Patent Application Laid-open No. 2005-215742 is an autonomous travel vehicle equipped with a GPS and sensors for detecting information necessary for the vehicle to travel in an autonomous manner, such as a vehicle speed, an attitude, an engine speed, and a steering angle. This vehicle has a function of continuing an autonomous travelling operation by switching a navigation mode to a dead reckoning navigation mode or an inertial navigation mode if positional information cannot be obtained through the GPS or positional information obtained through the GPS is deteriorated in precision, and of aborting the autonomous travelling operation if a state where positional information cannot be obtained through the GPS extends for a predetermined time, a state where positional information obtained through the GPS is deteriorated in precision extends for a predetermined time, or a steering mechanism cannot be controlled.

According to Japanese Patent Application Laid-open No. 2011-220104, a current position of a loaned moving work vehicle, a value of a service meter, a fuel quantity, an engine speed, an engine cooling water temperature, a battery voltage, a discharge pressure of a hydraulic pump, an oil quantity, an abnormality (error code), an image captured by a camera, and the like are sent via a communication device to and displayed on a terminal device in a remote location, as moving body information. This feature controls the moving work vehicle that is away from the terminal device, and, if it is determined that the moving work vehicle is used in a harsh environment, notifies a user to whom the moving work vehicle is loaned about the determination.

SUMMARY OF THE INVENTION

According to one aspect of the present invention, a work vehicle includes travelling work state detection sensors and circuitry. The travelling work state detection sensors are to detect a travelling work state of the work vehicle to output detected signals indicating the traveling work state. The circuitry is configured to calculate a position of the work vehicle based on positioning data. The circuitry is configured to determine that an early abnormality occurs when the detected signals satisfy a first condition, the work vehicle being in an early stage of trouble in travelling due to the early abnormality. The circuitry is configured to determine that an actual abnormality occurs when the detected signals satisfy a second condition which has a second threshold severer than a first threshold of the first condition, the work vehicle being in trouble in travelling due to the actual abnormality. The circuitry is configured to generate abnormality information including at least one of the early abnormality and the actual abnormality and including an abnormality occurring position of the work vehicle where the at least one of the early abnormality and the actual abnormally occurs. The circuitry is configured to provides a notification of the early abnormality toward an outside of the work vehicle when it is determined that the early abnormality occurs. The circuitry is configured to provide a notification of the actual abnormality toward an outside of the work vehicle when it is determined that the actual abnormality occurs.

According to another aspect of the present invention, a work vehicle includes travelling work state detection sensors, a first calculator, a first processor, a second processor, an information generator, a first notifier, and a second notifier. The travelling work state detection sensors are to detect a travelling work state of the work vehicle to output detected signals indicating the traveling work state. The first calculator is to calculate a position of the work vehicle based on positioning data. The first processor is to determine that an early abnormality occurs when the detected signals satisfy a first condition, the work vehicle being in an early stage of trouble in travelling due to the early abnormality. The second processor is to determine that an actual abnormality occurs when the detected signals satisfy a second condition which has a second threshold severer than a first threshold of the first condition, the work vehicle being in trouble in travelling due to the actual abnormality. The information generator is to generate abnormality information including at least one of the early abnormality and the actual abnormality and including an abnormality occurring position of the work vehicle where the at least one of the early abnormality and the actual abnormality occurs. The first notifier is to provide a notification of the early abnormality toward an outside of the work vehicle when it is determined that the early abnormality occurs. The second notifier is to provide a notification of the actual abnormality toward the outside of the work vehicle when it is determined that the actual abnormality occurs.

According to further aspect of the present invention, an abnormality notification method for a work vehicle includes detecting a travelling work state of the work vehicle to output detected signals indicating the traveling work state. A position of the work vehicle is calculated based on positioning data. It is determined that an early abnormality occurs when the detected signals satisfy a first condition. The work vehicle is in an early stage of trouble in travelling due to the early abnormality. It is determined that an actual abnormality occurs when the detected signals satisfy a second condition which has a second threshold severer than a first threshold of the first condition. The work vehicle is in trouble in travelling due to the actual abnormality. Abnormality information including at least one of the early abnormality and the actual abnormality and including an abnormality occurring position of the work vehicle where the at least one of the early abnormality and the actual abnormality occurs is generated. A notification of the early abnormality is provided toward an outside of the work vehicle when it is determined that the early abnormality occurs. A notification of the actual abnormality is provided toward the outside of the work vehicle when it is determined that the actual abnormality occurs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
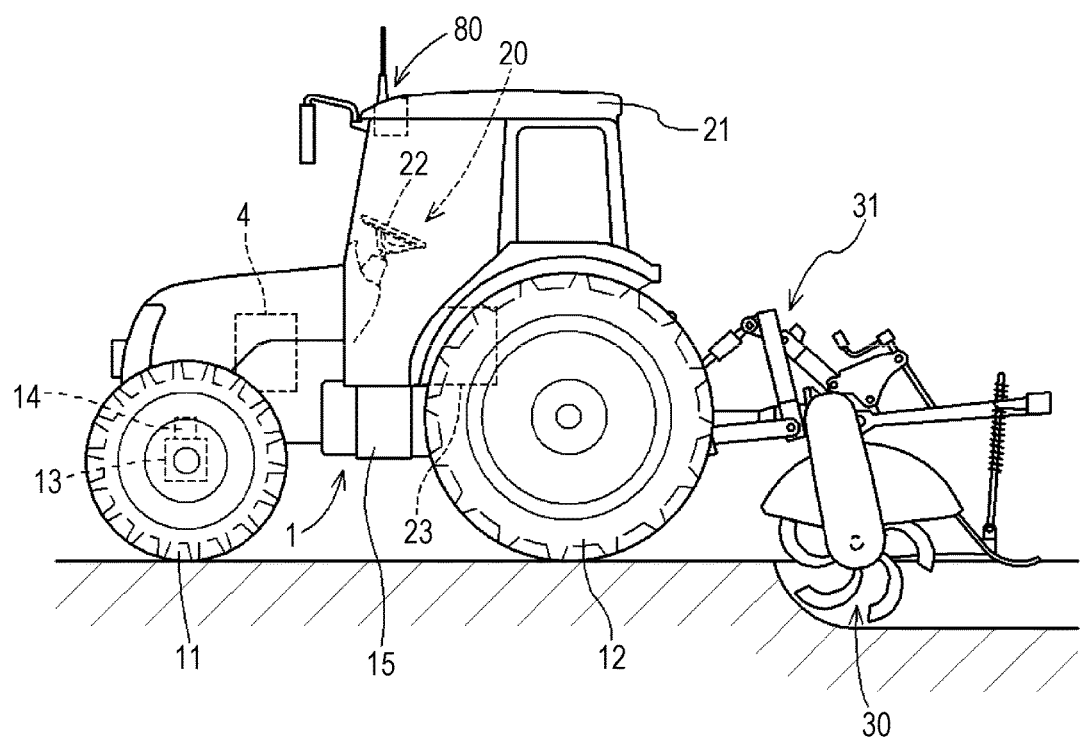
FIG. 1 is a side view of a tractor which is an exemplary embodiment of a work vehicle.

The embodiments will now be described with reference to the accompanying drawings, wherein like reference numerals designate corresponding or identical elements throughout the various drawings.

Next, with reference to the drawings, a work vehicle according to a specific exemplary embodiment of the present invention will now be described herein. In this exemplary embodiment, as shown in FIG. 1, the work vehicle is a tractor that travels and works in a field (work field) separated by ridges as boundaries. This tractor is provided with an operation unit 20 partitioned by a cabin 21 at a center of a vehicle body 1 supported by front wheels 11 and rear wheels 12. At a rear of the vehicle body 1, a work apparatus 30 that is a rotary tilling machine is mounted via a hydraulic lifting mechanism 31. The front wheels 11 function as steering control wheels through which the tractor changes a travel direction when a steering angle of the steering control wheels is changed. The steering angle of the front wheels 11 is changed by an operation of a steering mechanism 13. The steering mechanism 13 includes a steering motor 14 for automatic steering. For manual travelling, the front wheels 11 are steered by operating a steering wheel 22 disposed on the operation unit 20. An engine 4 is mounted in a front area of the vehicle body 1, and engine power is transmitted to the front wheels 11 and the rear wheels 12 via a transmission 15 including a multiple-transmission mechanism and a clutch mechanism. A fuel tank 23 for supplying fuel to the engine 4 is disposed under the cabin 21. The fuel tank 23 is attached with a residual fuel quantity sensor that detects a residual fuel quantity.

In the cabin 21 of the tractor, a satellite positioning module 80 configured as a GNSS module is provided. As a component of the satellite positioning module 80, a satellite antenna for receiving GPS signals and GNSS signals is attached at a ceiling area of the cabin 21. The satellite positioning module 80 may include an inertial navigation module incorporated with a gyro acceleration sensor and a magnetic director sensor for complementing satellite navigation. The inertial navigation module may also be provided in a different location from that of the satellite positioning module 80. Various sensors that output detected signals indicating a travelling work state of this work vehicle are further disposed around the vehicle body 1 and the work apparatus 30.

Figure 2:
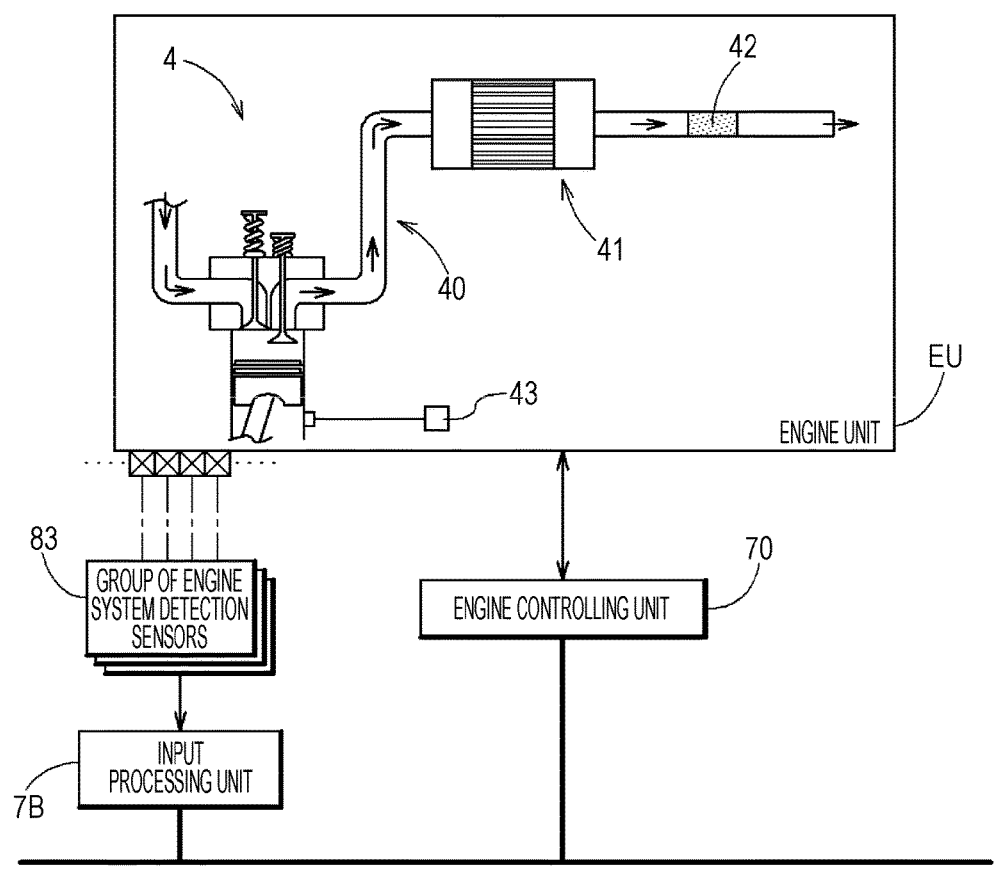
FIG. 2 is an explanatory view illustrating a configuration of an engine system of the tractor.

As shown in FIG. 2, the engine 4 that is a diesel engine constitutes an engine unit EU attached with, for example, an exhaust pipe unit 40 for discharging exhaust gas from this engine 4, an exhaust gas purifier 41, a selective catalytic reduction (SCR) 42, and a separator 43. In this exemplary embodiment, the exhaust gas purifier 41 includes a filter for collecting particulate matter contained in exhaust gas, i.e., a diesel particulate filter (DPF). Exhaust gas from the engine 4 flows into a front end of the exhaust gas purifier 41, and exhaust gas treated by the exhaust gas purifier 41 flows from a rear end of the exhaust gas purifier 41. The exhaust gas flowed from the exhaust gas purifier 41 passes through the SCR 42. At that time, the SCR 42 sprays aqueous urea toward the exhaust gas to purify nitrogen oxide in the exhaust gas.

Since particulate matter accumulates in the DPF as a travel time increases, a filter regeneration process is required to be performed to burn and remove the particulate matter when an accumulation amount (DPF accumulation amount) reaches a predetermined value. Although aqueous urea to be used in the SCR 42 is stored in an aqueous urea tank, the aqueous urea is required to be replenished when its residual quantity lowers below a predetermined value. To this end, a sensor for detecting the DPF accumulation amount and a sensor for detecting a residual aqueous urea quantity are disposed. The engine unit EU is further disposed with a sensor for detecting a water level in the separator 43 and a sensor for detecting an engine water temperature. In FIG. 2, these sensors around the engine are collectively indicated as a group of engine system detection sensors 83.

Figure 3:
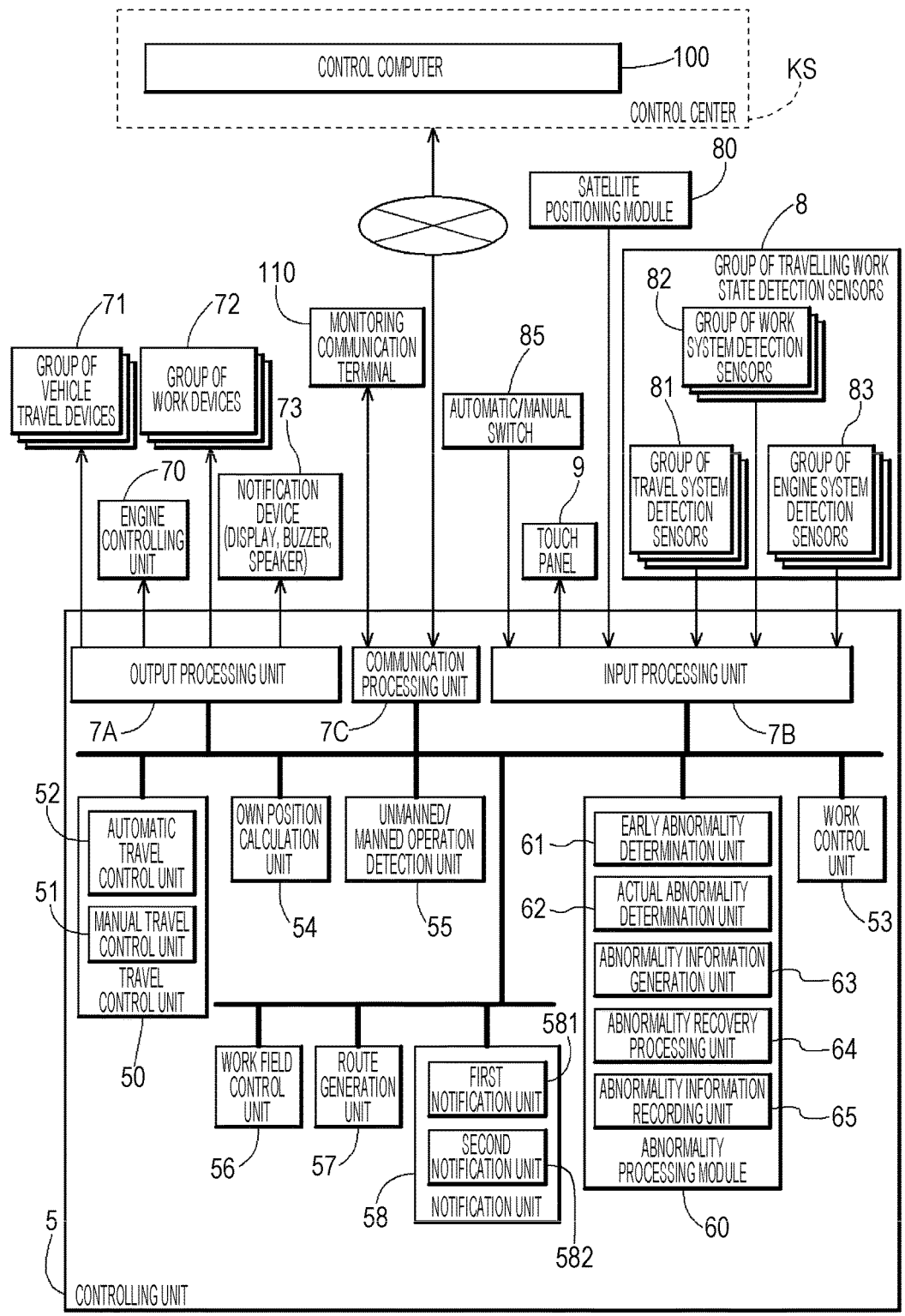
FIG. 3 is a functional block diagram illustrating a control system of the tractor.

FIG. 3 illustrates a control system configured in this tractor. This control system has a function of controlling abnormalities on the tractor (work vehicle) that could occur during travelling works in fields (work fields). A controlling unit 5 (circuitry 5) is a core element of this control system, and includes an output processing unit 7A and an input processing unit 7B, which respectively function as input and output interfaces, and a communication processing unit 7C. The output processing unit 7A is connected with, for example, an engine controlling unit 70, a group of vehicle travel devices 71, a group of work apparatuses and devices 72, and a notification device 73. The engine controlling unit 70 controls various operation devices included in the engine unit EU based on control instructions sent through the output processing unit 7A, or based on an individual control program. The group of vehicle travel devices 71 includes the steering motor 14 and devices to be controlled for allowing the vehicle to travel normally, such as operation devices incorporated in the transmission 15. The group of work apparatuses and devices 72 includes, for example, a drive mechanism for the work apparatus 30, and a lifting mechanism 31 that raises and lowers the work apparatus 30. The notification device 73 includes a display, lamps, and a speaker, and is used to warn the driver and a supervisor of an abnormality occurred in a travelling work. Signals are transmitted between the notification device 73 and the output processing unit 7A in a wired or wireless manner.

The communication processing unit 7C exchanges data with an external computer in conformity to a wireless communication standard and a wired communication standard. FIG. 3 shows a control computer 100 constituted as an external computer in a control center KS in a remote location, and a monitoring communication terminal 110 held by a supervisor supervising the work vehicle being unmanned operated.

The input processing unit 7B is coupled to, for example, a group of travelling work state detection sensors 8, the satellite positioning module 80, an automatic/manual switch 85, and a touch panel 9. The group of travelling work state detection sensors 8 is a group of sensors for detecting various states of this tractor performing a travelling work (including switches and buttons). The group of travelling work state detection sensors 8 includes a group of travel system detection sensors 81, a group of work system detection sensors 82, and the group of engine system detection sensors 83. The group of travel system detection sensors 81 includes sensors for detecting vehicle body states and travel states including a vehicle speed, a transmission state, an inclination of the vehicle body, and a residual fuel quantity. The group of work system detection sensors 82 includes, for example, sensors for detecting a ground clearance and an inclination of the work apparatus 30, and sensors for detecting workloads and the like. The group of engine system detection sensors 83 includes, for example, sensors for detecting an engine speed and an engine water temperature, a sensor for assuming or detecting a DPF accumulation amount, and sensors for detecting a residual SCR quantity (residual aqueous urea quantity) and a water level of the separator.

The automatic/manual switch 85 is a switch that selects either an automatic steering mode for travelling with automatic steering or a manual steering mode for travelling with manual steering. For example, by operating the automatic/manual switch 85 while travelling, a mode of the work vehicle can be switched from the automatic travel (automatic steering) mode to the manual travel (manual steering) mode, and vice versa.

The touch panel 9 cooperates with a liquid crystal display included in the notification device 73 to accept an entry of a user operation.

The controlling unit 5 is configured to include an abnormality processing module 60 that is a core function unit for controlling abnormalities that could occur in the work vehicle during travelling work, in particular an unmanned travelling work. The controlling unit 5 also includes a travel control unit 50, a work control unit 53, an own position calculation unit 54 (a first calculator 54), an unmanned/manned operation detection unit 55, a work field control unit 56, a route generation unit 57, and a notification unit 58. Although the controlling unit 5 is illustrated as a single unit in FIG. 3 in order to provide a simple description, the controlling unit 5 is normally divided into a plurality of subunits, and the subunits are connected in such a manner that data can be transmitted each other through an on-vehicle LAN or other communication lines.

Since the automatic travel (automatic steering) mode and the manual travel (manual steering) mode are both configured to be available in this tractor for travelling, the travel control unit 50 for controlling the group of vehicle travel devices 71 includes a manual travel control unit 51 and an automatic travel control unit 52. In accordance with operations of the driver, the manual travel control unit 51 controls the group of vehicle travel devices 71. Based on a deviation between an own position and a target travel route, the automatic travel control unit 52 generates and outputs an automatic steering instruction to the steering motor 14 via the output processing unit 7A. To control movement of the work apparatus 30, the work control unit 53 provides control signals to the group of work apparatuses and devices 72. Based on the positioning data sent from the satellite positioning module 80, the own position calculation unit 54 calculates an own position. The unmanned/manned operation detection unit 55 determines whether the work vehicle is unmanned operated (no-driver operated) or manned operated based on a state signal sent from the automatic/manual switch 85. A determination as to whether the driver is seated on a driver's seat can also be made based on a state signal sent from a seat switch included in the group of travel system detection sensors 81.

The notification unit 58 generates notification information (including a display signal, a voice signal, a lamp drive signal, and a buzzer drive signal) for externally notifying information regarding an early abnormality or an actual abnormality to the driver or the supervisor through the notification device 73 such as the display, the speaker, and the lamps. This notification unit 58 includes a first notification unit 581 (a first notifier 581) and a second notification unit 582 (a second notifier 582) each having different functions. As will be described in detail later, when the abnormality processing module 60 determines an early abnormality in a particular travelling work state, the first notification unit 581 notifies the early abnormality outside the work vehicle. When the abnormality processing module 60 determines an actual abnormality that is more serious than the early abnormality, the second notification unit 582 notifies the actual abnormality outside the work vehicle. A message or an illustration may be used when a display signal is used as notification information. Thus, a notification of an early abnormality and a notification of an actual abnormality can be expressly distinguished. When a lamp drive signal or a buzzer drive signal is used as notification information, a notification of an early abnormality and a notification of an actual abnormality can be distinguished with a drive pattern of the lamps and the buzzer, such as different intermittent drive intervals, for example. When a lamp drive signal is used as notification information, a format may be adopted, where a yellow lamp is driven to notify an early abnormality, whereas a red lamp is driven to notify an actual abnormality.

The notification unit 58 can further transmit the above described notification information to the monitoring communication terminal 110 or an ordinary mobile phone through the communication processing unit 7C. Even when the tractor is automatically traveled and is not watched directly, the supervisor can promptly be notified of an abnormality occurred in the tractor being automatic traveled.

The work field control unit 56 controls field information (work field information) that is information regarding the field in which the work vehicle works and travels. The field information includes data such as a map position, shape, and size of a field, as well as plant varieties. The field information can be downloaded from, for example, the control computer 100 disposed in the control center KS in the remote location or a farmer's home.

Based on the field information, the route generation unit 57 reads external shape data of the field, and generates a target travel route that fits to this field. This target travel route may be automatically generated based on basic initial parameters such as a start point and an end point entered by an operator, or may be automatically generated based on a simple route pattern entered by the operator. A configuration may be adopted, through which a target travel route itself is downloaded from the control computer 100. In any case, the target travel route obtained from the route generation unit 57 is developed in a memory, and used by the work vehicle to travel along the target travel route regardless of whether the work vehicle is operated in either the automatic travel (automatic steering) mode or the manual travel (manual steering) mode.

The abnormality processing module 60 determines an abnormality that could cause trouble in travelling work, based on detected signals indicating a travelling work state, which are sent from the group of travelling work state detection sensors 8, and provides a result of determination of the abnormality to the notification unit 58. The abnormality processing module 60 according to this exemplary embodiment includes an early abnormality determination unit 61 (a first processor 61), an actual abnormality determination unit 62 (a second processor 62), an abnormality information generation unit 63 (an information generator 63), an abnormality recovery processing unit 64, and an abnormality information recording unit 65.

The early abnormality determination unit 61 determines, as an early abnormality, an abnormality at an early stage, which could cause trouble in travelling work, based on detected signals sent from the group of travelling work state detection sensors 8 and a first condition. When the early abnormality is determined, the early abnormality determination unit 61 gives information about an event causing the early abnormality in the travelling work, for example, a rise in an engine water temperature, and a reduction in a residual fuel quantity, to the first notification unit 581. The actual abnormality determination unit 62 determines, as an actual abnormality, the abnormality at an actual stage, which is more serious than the early abnormality, based on detected signals sent from the group of travelling work state detection sensors 8 and a second condition that is more rigorous than the above described first condition. When the actual abnormality is determined, the actual abnormality determination unit 62 gives information about an event causing the actual abnormality in the travelling work to the second notification unit 582. The early abnormality determination unit 61 and the actual abnormality determination unit 62 determine various abnormalities in travelling work, and signals to be detected and used for determination vary depending on a type of abnormality. The first condition used for determining an early abnormality and the second condition used for determining an actual abnormality also vary depending on a type of a detected signal.

When the early abnormality determination unit 61 determines an early abnormality or when the actual abnormality determination unit 62 determines an actual abnormality, the abnormality information generation unit 63 generates, in a predetermined format, abnormality information combined with a content of the abnormality and a vehicle position at which the abnormality has occurred. The abnormality information recording unit 65 records the abnormality information generated by the abnormality information generation unit 63 in line with a travel locus recorded in a format created so as to conform to a travel locus calculated based on own positions of the work vehicle sequentially calculated by the own position calculation unit 54. The recorded abnormality information is sent to the control computer 100 in the control center KS with a real-time process or a batch process for use in future maintenance and inspection control of the tractor.

A preferable abnormality control first notifies an abnormality only when an early abnormality is determined, and, after that, when the abnormality worsens to an extent that the abnormality is determined as an actual abnormality, aborts a travelling work itself. A specific example of such an abnormality control will now be described herein.

(1) Engine water temperature: Since an engine water temperature could lead to a risk of overheat, first an early abnormality is notified when the engine water temperature reaches a predetermined temperature. After the engine water temperature further rises, and an actual abnormality is determined, the actual abnormality is notified, and a process for preventing the engine from being heated excessively is executed, such as the tractor is stopped and an engine speed is lowered to an appropriate speed.

(2) DPF accumulation amount: An early abnormality is notified when a DPF accumulation amount reaches a predetermined, excessive accumulation amount, and a filter regeneration process through which particulate matter accumulated in the filter is burnt and removed is urged to be performed. If the filter regeneration process has not yet performed, but particulate matter accumulates excessively, thus an actual abnormality is determined, the actual abnormality is notified, the tractor is stopped, and the filter regeneration process is forcibly executed in order to avoid a risk of damage in the DPF, so that the DPF is not required to be replaced.

(3) Residual fuel quantity: At a residual fuel quantity with which the tractor can still travel some distance, an early abnormality is notified, and supply of fuel is urged. If the tractor is kept traveled without supplied with fuel, and fuel is about to run short, an actual abnormality is determined and notified. When the tractor is automatically traveled, the tractor is forcibly stopped, or an automatic travelling operation is executed to cause the tractor to approach a ridge set as a fuel supply location.

(4) Water level of separator: If an abnormality recovery process has not yet performed, thus a water level of separator rises, even after an early abnormality is notified, an actual abnormality is determined and notified, and the tractor is forcibly stopped.

(5) Residual SCR quantity: Similar to the residual fuel quantity, if a reductant, i.e., aqueous urea has not yet replenished, thus aqueous urea reduces to a dangerous water level, even after an early abnormality is notified, an actual abnormality is notified, and the tractor is forcibly stopped, or an automatic travelling operation is executed to cause the tractor to approach a ridge set as an aqueous urea supply location.

Based on an early abnormality determined by the early abnormality determination unit 61 or an actual abnormality determined by the actual abnormality determination unit 62, the abnormality recovery processing unit 64 automatically executes any of the above described abnormality recovery processes for resolving the abnormality. Since abnormalities include abnormalities relating to various failure events, such as travel system abnormalities, work system abnormalities, and engine system abnormalities, the abnormality recovery processing unit 64 stores procedures for abnormality recovery processes associated with early abnormalities and actual abnormalities regarding the aforementioned abnormalities. Abnormality recovery processes often vary depending on whether the tractor is in automatic travelling (unmanned travelling) or manual travelling (manned travelling). In automatic travelling, if the supervisor fails to find a notification on an abnormality, the abnormality becomes serious. To avoid such an event, an abnormality recovery process is provided to partially or completely abort the automatic travelling if a particular abnormality has been determined. For an insufficient fuel abnormality and an insufficient SCR (insufficient aqueous urea) abnormality, another abnormality recovery process is provided to cause the tractor to automatically travel, approach a ridge, and wait for supply. If a particular abnormality occurs, two options are available: to wait until a supervisor resolves the abnormality; and to perform an abnormality recovery process automatically by the work vehicle itself. However, such a selection can often differ depending on skills of the supervisor. Therefore, a content of an abnormality recovery process is set beforehand in accordance with a type of an abnormality.

A basic flow of abnormality control performed by the abnormality processing module 60 and the notification unit 58 is as described below.

(a) In an automatic travelling work state, an abnormality that could damage the tractor (work vehicle) or an abnormality that could lower work efficiency is monitored by comparing the abnormality with conditions set per a type of an abnormality.

(b) When an early abnormality is determined based on a first condition, a content of the early abnormality is externally notified to the supervisor by means of a visual or audio device, and is sent to other work vehicles and the monitoring communication terminal 110 via a wireless communication or the like.

(c) When an actual abnormality is determined based on a second condition that is more rigorous than the first condition, since the tractor (work vehicle) could be damaged if the travelling work continues, the content of the actual abnormality is externally notified to the supervisor by means of a visual or audio device, and the automatic travelling work is aborted.

(d) An own position at which the early abnormality has occurred and an own position at which the actual abnormality has occurred are recorded together with contents of the abnormalities.

(e) An own position at which an early abnormality has occurred and an abnormality recovery process to be performed when an actual abnormality has occurred are set separately per a type of an abnormality.

Figure 4:
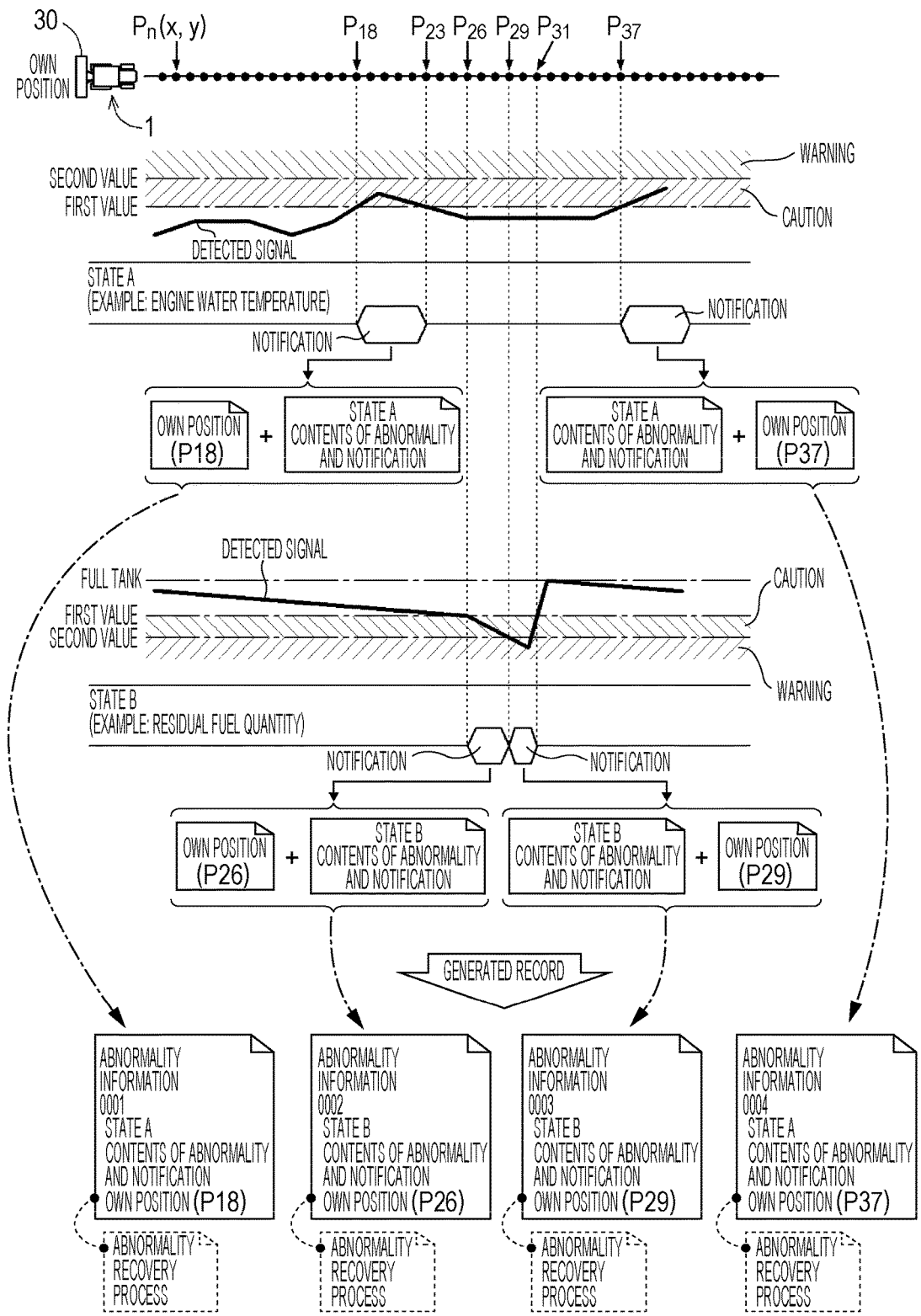
FIG. 4 is an explanatory view illustrating an example of an abnormality occurrence management control in a travelling work performed in a work field.

Next, flows of abnormality controls with regard to two states (state A: engine water temperature, state B: residual fuel quantity) of the tractor (work vehicle) in travelling work will now be described herein with reference to FIG. 4. In examples shown in FIG. 4, the tractor travels along a predetermined target travel route. A straight line in FIG. 4 illustrates the target travel route along which the tractor should travel. However, an actual travel route includes many straight travel routes and curved travel routes (180° turn and 90° turn) joining the adjacent straight travel routes. Reference signs Pn (n: a suffix) in FIG. 4 represent travel points identifying own positions on the target travel route. The travel points are each added with a map coordinate position (x, y).

An engine water temperature representing state A, which is one of travelling work states, corresponds to a detected signal sent from a water temperature sensor for detecting an engine water temperature. The detected signal sent from the water temperature sensor is compared with a first value (first condition) and a second value (second condition), which are water temperature thresholds set beforehand as conditions for determining abnormality. The second value is set higher than the first value. When an abnormality where a detected signal exceeds the first value (a type of an early abnormality) occurs, notification is provided to urge execution of a measure for reducing an engine load. When an abnormality where a detected signal exceeds the second value (a type of an actual abnormality) further occurs, the tractor is stopped, and notification is provided to urge execution of a measure for driving the engine at an engine speed around an idling speed provided that a radiator is normal. These actions are executed automatically in an automatic travelling operation where no passenger is attended.

In the examples shown in FIG. 4, since a detected signal sent from the water temperature sensor exceeds the first value at an own position of P18, an overheat caution is notified as a notification operation of state A. When a user receives this notification, he/she lowers an operation speed to reduce an engine load of the tractor. Next, since a detected signal sent from the water temperature sensor lowers below the first value at an own position of P23, the notification operation of state A is cancelled. In the examples shown in FIG. 4, since a detected signal sent from the water temperature sensor exceeds the first value again at an own position of P37, an overheat caution is notified as a notification operation of state A.

A residual fuel quantity representing state B, which is another one of travelling work states, corresponds to a detected signal sent from the residual fuel quantity sensor provided in the fuel tank 23. The detected signal on a residual fuel quantity is compared with a first value and a second value, which are thresholds for residual fuel quantity set beforehand as conditions for determining abnormality. The second value is set lower than the first value (a value close to a minimum fuel quantity). When an abnormality where a detected signal lowers below the first value (a type of an early abnormality) occurs, an insufficient fuel caution is notified. When an abnormality where a detected signal lowers below the second value (a type of an actual abnormality) further occurs, an insufficient fuel warning is notified to urge immediate supply of fuel.

In the examples shown in FIG. 4, since a detected signal sent from the residual fuel quantity sensor lowers below the first value at an own position of P26, an insufficient fuel caution is notified as a notification operation of state B. When the supervisor of this travelling work receives this caution, he/she investigates a time and a place for supplying fuel to the tractor. Since the tractor further consumes fuel, and a detected signal sent from the residual fuel quantity sensor lowers below the second value at an own position of P29, an insufficient fuel warning is notified. Accordingly, the tractor once stops the travelling work. The tractor is then supplied with fuel, or moved to a place appropriate for supplying fuel. When the work vehicle is automatically traveled and controlled, the work vehicle is automatically traveled near an agricultural truck loaded with a reserve fuel tank and parked on a ridge. When fuel is supplied, the insufficient fuel warning and the insufficient fuel caution are cancelled at an own position of P31.

As described above, when detected signals sent from the group of travelling work state detection sensors 8 are evaluated with predetermined conditions, and an early abnormality or an actual abnormality is determined, abnormality information is generated by the abnormality information generation unit 63. The abnormality information includes, as attribute data, a type of a state determined as an abnormality, an executed notification operation, a detected signal value, and an own position at which the abnormality has occurred. When a recovery process (e.g., fuel supply, engine speed control) is executed to resolve the abnormality at that time, a content of the recovery process is added to the abnormality information. The generated abnormality information is recorded by the abnormality information recording unit 65 in a format created such that the abnormality information follows a travel locus calculated based on own positions of the work vehicle calculated sequentially.

A work vehicle like a tractor requires various entry operations even during travelling. A supervisor supervising the work vehicle being traveled automatically is also required to make various entry operations on the monitoring communication terminal 110 held by himself/herself. When making these entry operations on the touch panel 9 having a relatively smaller screen size, care should be taken to avoid erroneous operations. An erroneous operation prevention technique adopted in the touch panel 9 of this work vehicle will now be described herein with reference to FIGS. 5, 6, and 7.

Figure 5:
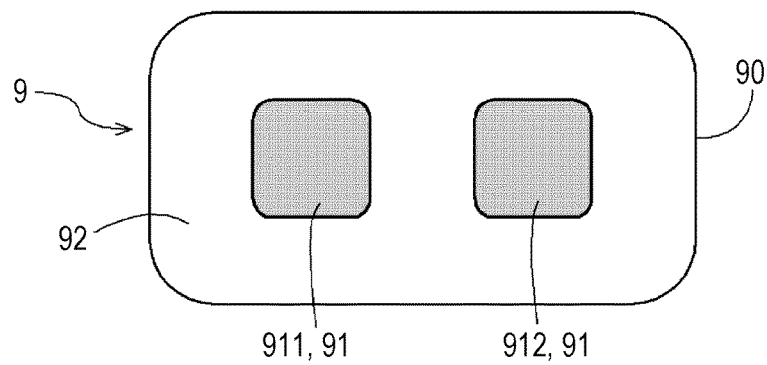
FIG. 5 is an explanatory view illustrating a technique of preventing as much as possible erroneous touch operations on a touch panel.

FIG. 5 shows an example of a touch surface 90 of the touch panel 9, where a plurality of (two in FIG. 5) valid operation areas 91 are disposed separately each other. An area on the touch surface 90 excluding the valid operation areas 91 is an invalid operation area 92 where a touch operation becomes invalid. In this example, the valid operation areas 91 include a first operation button 911 and a second operation button 912 disposed separately each other. A liquid crystal panel that cooperates with the touch panel 9 visibly displays the first operation button 911 and the second operation button 912.

When the first operation button 911 and the second operation button 912 are kept touched simultaneously for a predetermined period, an operation entry command is generated and assigned to the valid operation areas 91, and a process based on this operation entry command is executed. A condition satisfying a simultaneous touch of the first operation button 911 and the second operation button 912 is a simultaneous touch where a time difference is within approximately one second. A touch operation made before notified with a display or another method urging an entry operation is determined to be invalid. This configuration can reduce erroneous operations that could occur when the touch surface 90 is accidentally touched.

Figure 6:
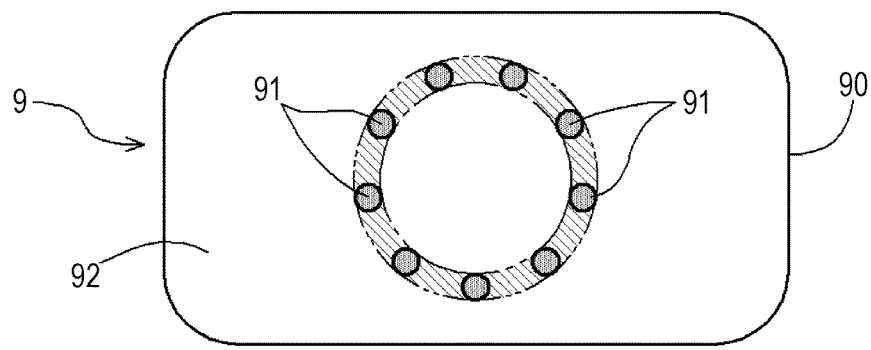
FIG. 6 is an explanatory view illustrating a technique of preventing as much as possible erroneous trace operations on the touch panel.
Figure 7:
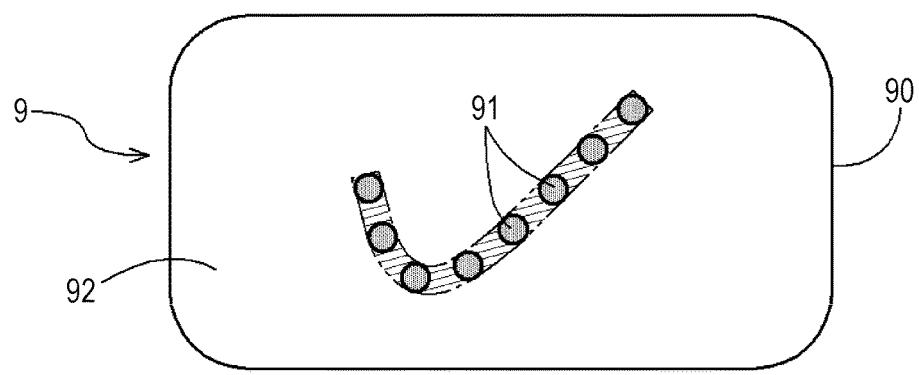
FIG. 7 is another explanatory view illustrating a technique of preventing as much as possible erroneous trace operations on the touch panel.

In FIGS. 6 and 7, the valid operation areas 91 configured by a plurality of dots defining a particular figure or a particular line are disposed on the touch surface 90 of the touch panel 9. An area on the touch surface 90 excluding the valid operation areas 91 is an invalid operation area 92 where a touch operation becomes invalid. In FIG. 6, the valid operation areas 91 configured by nine dots defines a circle. In FIG. 7, the valid operation areas 91 configured by eight dots define a check pattern. The liquid crystal panel that cooperates with the touch panel 9 visibly displays the particular figure (the circle in FIG. 6) or the particular diagram (the check pattern in FIG. 7) defined by the valid operation areas 91. An entry operation by a user is tracing of the circle or the check pattern in a single stroke made after notified with a display or another method urging the entry operation. A tracing operation may start at any position at that time, but continuity of an order of dots being traced becomes a condition for determining whether the tracing operation is valid or invalid. A total tracing time is also limited. A tracing operation made before notified with a display or another method urging an operation input is also determined to be invalid. To facilitate an easy tracing operation, a traced locus is visibly shown on the liquid crystal panel.

Other Exemplary Embodiments (1) The work vehicle in the above described exemplary embodiment has the automatic steering function of unmanned travel or no-driver travel with automatic steering and the manual steering function of manned travel with manual steering to select either the automatic travel (automatic steering) mode or the manual travel (manual steering) mode. However, the embodiments of the present invention are also applicable to a work vehicle having the manual steering function only or a work vehicle having the automatic steering function only. The embodiments of the present invention are also applicable to any work vehicles used in a work vehicle cooperation system where a plurality of work vehicles are loaded in a work field, and some of the plurality of work vehicles are operated in the manual travel (manual steering) mode, while the remaining work vehicles are operated in the automatic travel (automatic steering) mode.

(2) In the above described exemplary embodiment, the first condition and the second condition that is more rigorous than first condition are applied to a single detected signal to determine either an early abnormality or an actual abnormality. However, instead of the first condition and the second condition, a method for determining either an early abnormality or an actual abnormality based on a combination of different detected signals may be adopted.

(3) Each function unit in the functional block diagram shown in FIG. 3 is separated for description purposes. In an actual case, each function unit can be integrated with other function units, or divided into a plurality of sub-function units. In addition, at least a part of the abnormality processing module 60 may be configured in a mobile phone or a tablet computer that can exchange data with the controlling unit 5 of the work vehicle.

(4) The above described exemplary embodiments have appointed, as the work vehicle, a tractor equipped with a rotary tilling machine as the work apparatus 30. However, in addition to such a tractor, various work vehicles may be adopted as exemplary embodiments, such as agricultural vehicles including rice transplanters, fertilizer distributors, combines, and construction vehicles equipped with a dozer or a roller as the work apparatus 30.

INDUSTRIAL APPLICABILITY

The embodiments of the present invention are applicable to all work vehicles that have an own position function and a travelling work state detection function, and that are used for performing a travelling work in a work field.

According to one aspect of the present invention, a work vehicle includes travelling work state detection sensors and circuitry. The travelling work state detection sensors is to detect a travelling work state of the work vehicle to output detected signals indicating the traveling work state. The circuitry is configured to calculate a position of the work vehicle based on positioning data. The circuitry is configured to determine that an early abnormality occurs when the detected signals satisfy a first condition, the work vehicle being in an early stage of trouble in travelling due to the early abnormality. The circuitry is configured to determine that an actual abnormality occurs when the detected signals satisfy a second condition which has a second threshold severer than a first threshold of the first condition, the work vehicle being in trouble in travelling due to the actual abnormality. The circuitry is configured to generate abnormality information including at least one of the early abnormality and the actual abnormality and including an abnormality occurring position of the work vehicle where the at least one of the early abnormality and the actual abnormally occurs. The circuitry is configured to provides a notification of the early abnormality toward an outside of the work vehicle when it is determined that the early abnormality occurs. The circuitry is configured to provide a notification of the actual abnormality toward an outside of the work vehicle when it is determined that the actual abnormality occurs. The term "travelling work" used herein includes work while travelling, a travelling operation itself, work itself, a state where at least one of the work while travelling, the travelling operation itself, and the work itself is performed, and a state where such travelling work is temporarily stopped.

According to this configuration, an abnormality occurred in a work vehicle during travelling work is determined and classified into an early abnormality which is an abnormality at an early stage, or an actual abnormality which is the abnormality at an actual stage and is further worsened from the early stage, and the early abnormality and the actual abnormality are externally notified. Therefore, a supervisor supervising the work vehicle externally receives notification of the early abnormality as a caution on the abnormality, for example, or the actual abnormality, a degree of which is further worsened from a degree of the early abnormality, as a warning on the abnormality, for example. One of or both the early abnormality and the actual abnormality is or are combined as abnormality information with the own position calculated when the abnormality has occurred. Even though the supervisor of the work vehicle is present at a location from which the work vehicle cannot be seen or a position of the work vehicle cannot be identified, the supervisor is able to therefore know a location at where an abnormality has occurred, as well as is able to take a more appropriate action against the occurred abnormality.

By investigating an abnormality occurred in a work vehicle during travelling, while taking into account a travel route along which the work vehicle has actually traveled, a cause of the abnormality and its countermeasure can be examined. To this end, generated abnormality information should be connected to travelling operations and recorded, and the record should be read later. According to an advantageous exemplary embodiment of the present invention, therefore, the circuitry is configured to record the abnormality information in line with a travel locus.

For an automatic travelling work vehicle that travels automatically with an automatic steering feature with which no driver is required, a supervisor positioned away from the automatic travelling work vehicle or a driver operating another manned work vehicle is required to check a state of a travelling work, in particular, check if any abnormality occurs. Notifications of an early abnormality and an actual abnormality externally as described above are therefore particularly advantageous for such an automatic travelling work vehicle. To this end, according to another advantageous exemplary embodiment of the present invention, the circuitry is configured to generate, based on a difference between a target travel route and the position of the work vehicle, an automatic steering instruction to control the work vehicle to travel along the target travel route. Notification information regarding the early abnormality and the actual abnormality is sent to a communication terminal operated by a supervisor supervising an automatic travelling operation. This configuration allows the supervisor positioned away from the automatic travelling work vehicle or a driver operating another manned work vehicle to know promptly an abnormality occurred in the automatic travelling work vehicle, through the communication terminal. When the automatic travelling work vehicle provides notification of an abnormality through a lamp or a speaker, the supervisor is also able to know an abnormality occurred in the work vehicle even if the communication terminal is not held by the supervisor.

If an actual abnormality occurs in a work vehicle, travelling work should be aborted, and the abnormality should be resolved, because the actual abnormality may cause serious trouble in the travelling work. In particular, for a work vehicle automatically travelling without a driver, any action should be taken automatically against an abnormality. To this end, according to still another advantageous exemplary embodiment of the present invention, the circuitry is configured to execute an abnormality recovery process to resolve at least one of the early abnormality and the actual abnormality when it is determined that at least one of the early abnormality and the actual abnormality occurs. This abnormality recovery processing function may also be executed while the work vehicle is operated manually by a driver. The abnormality recovery process includes, for example, a program for allowing the work vehicle to travel in a shortest distance toward a location at where fuel can be supplied if an abnormality relates to running short of fuel, a program for stopping the work vehicle and driving an engine at an appropriate engine speed if an abnormality relates to overheating, and a program for stopping the work vehicle and executing a filter regeneration process if an abnormality relates to excessive accumulation of particulate matter in a diesel particulate filter (DPF).

If a determined abnormality may cause serious trouble in a travelling work, a process for immediately stopping the vehicle body, the engine, and the work apparatus, stopping the vehicle body and the work apparatus, or stopping the vehicle body only is required before executing a recovery process. In still another advantageous exemplary embodiment of the present invention, therefore, the abnormality recovery process includes a partial or complete stoppage of the automatic travelling operation.

For a work vehicle for performing an agricultural operation in a field, it is preferable that fuel should be supplied and a troubled engine should be repaired, as an abnormality recovery process, around the field such as on a ridge, instead of within the field. To this end, according to still another advantageous exemplary embodiment of the present invention, when the travelling operation is performed in a field separated by ridges as boundaries and the abnormality recovery process is performed near one of the ridges, the abnormality recovery process includes an automatic travelling operation through which the work vehicle automatically approaches one of the ridges.

Abnormalities that may cause serious trouble in a travelling work vary, not a single one, thus abnormality recovery processes vary. Support contents for a supervisor and other persons, required when performing an abnormality recovery process at that time, also vary depending on skills of the supervisor and other persons. The abnormality recovery processing unit may therefore be advantageous if a content of an abnormality recovery process is settable beforehand in accordance with a type of abnormality.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
    travelling work state detection sensors to detect a travelling work state of the work vehicle to output detected signals indicating the traveling work state; and
    circuitry configured to
        calculate a position of the work vehicle based on positioning data,
        determine that an early abnormality occurs when the detected signals satisfy a first condition, the work vehicle being in an early stage of trouble in travelling due to the early abnormality,
        determine that an actual abnormality occurs when the detected signals satisfy a second condition which has a second threshold severer than a first threshold of the first condition, the work vehicle being in trouble in travelling due to the actual abnormality,
        generate abnormality information including at least one of the early abnormality and the actual abnormality and including an abnormality occurring position of the work vehicle where the at least one of the early abnormality and the actual abnormality occurs,
        provide a notification of the early abnormality toward an outside of the work vehicle when the early abnormality is determined to have occurred, and
        provide a notification of the actual abnormality toward the outside of the work vehicle when the actual abnormality is determined to have occurred.

2. The work vehicle according to claim 1, wherein the circuitry is configured to record the abnormality information in line with a travel locus.

3. The work vehicle according to claim 1,
    wherein the circuitry is configured to generate, based on a difference between a target travel route and the position of the work vehicle, an automatic steering instruction to control the work vehicle to travel along the target travel route, and
    wherein notification information regarding the early abnormality and the actual abnormality is sent to a communication terminal operated by a supervisor supervising an automatic travelling operation.

4. The work vehicle according to claim 3, wherein the circuitry is configured to execute an abnormality recovery process to resolve at least one of the early abnormality and the actual abnormality when at least one of the early abnormality and the actual abnormality is determined to have occurred.

5. The work vehicle according to claim 4, wherein the abnormality recovery process includes a partial or complete stoppage of the automatic travelling operation.

6. The work vehicle according to claim 4, wherein, when the travelling operation is performed in a field separated by ridges as boundaries and the abnormality recovery process is performed near one of the ridges, the abnormality recovery process includes an automatic travelling operation through which the work vehicle automatically approaches one of the ridges.

7. The work vehicle according to claim 4, wherein a content of the abnormality recovery process is settable beforehand in accordance with a type of abnormality.

8. A work vehicle comprising:
    travelling work state detection sensors to detect a travelling work state of the work vehicle to output detected signals indicating the traveling work state;
    a first calculator to calculate a position of the work vehicle based on positioning data;
    a first processor to determine that an early abnormality occurs when the detected signals satisfy a first condition, the work vehicle being in an early stage of trouble in travelling due to the early abnormality;
    a second processor to determine that an actual abnormality occurs when the detected signals satisfy a second condition which has a second threshold severer than a first threshold of the first condition, the work vehicle being in trouble in travelling due to the actual abnormality;
    an information generator to generate abnormality information including at least one of the early abnormality and the actual abnormality and including an abnormality occurring position of the work vehicle where the at least one of the early abnormality and the actual abnormality occurs;
    a first notifier to provide a notification of the early abnormality toward an outside of the work vehicle when the early abnormality is determined to have occurred; and
    a second notifier to provide a notification of the actual abnormality toward the outside of the work vehicle when the actual abnormality is determined to have occurred.

9. An abnormality notification method for a work vehicle, comprising:
    detecting a travelling work state of the work vehicle to output detected signals indicating the traveling work state;
    using circuitry to calculate a position of the work vehicle based on positioning data;
    using circuitry to determine that an early abnormality occurs when the detected signals satisfy a first condition, the work vehicle being in an early stage of trouble in travelling due to the early abnormality;
    using circuitry to determine that an actual abnormality occurs when the detected signals satisfy a second condition which has a second threshold severer than a first threshold of the first condition, the work vehicle being in trouble in travelling due to the actual abnormality;
    generating abnormality information including at least one of the early abnormality and the actual abnormality and including an abnormality occurring position of the work vehicle where the at least one of the early abnormality and the actual abnormality occurs;

providing a notification of the early abnormality toward an outside of the work vehicle when the early abnormality is determined to have occurred; and providing a notification of the actual abnormality toward the outside of the work vehicle when the actual abnormality is determined to have occurred.

* * * * *